April 19, 1955 R. KÖHLER 2,706,491
SINGLE AND MULTI-RING VALVES
Filed Nov. 8, 1949
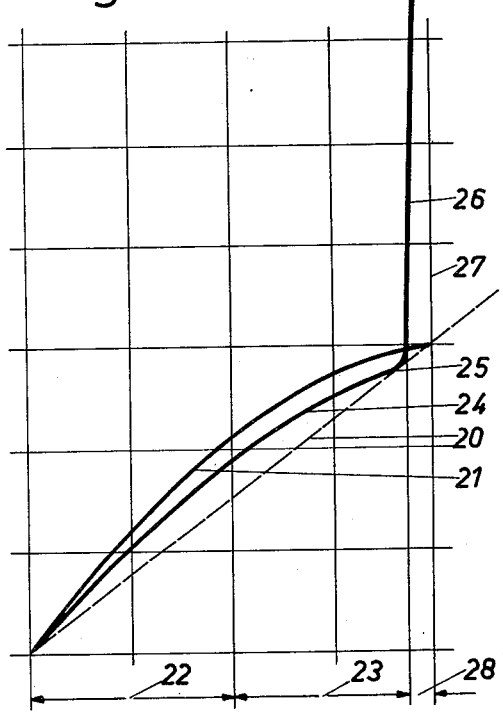
Inventor
R. Köhler United States Patent Office 2,706,491
Patented Apr. 19, 1955

2,706,491

SINGLE AND MULTI-RING VALVES

Robert Köhler, Vilkerath, Bezirk Koln, Germany

Application November 8, 1949, Serial No. 126,139

Claims priority, application Germany November 18, 1948

7 Claims. (Cl. 137—540)

This invention relates to a spring assembly for ring valves.

In the construction of machines in places where great forces are to be yieldably mounted in axial direction, spring arrangements have become known in which springs of truncated-cone shape are used. Such ring springs up to now could not have been used in ring valves because in valves the requirements of the springs as to softness are very high in proportion to their stroke and the known frusto-conical springs do not fulfill these requirements. Moreover the characteristic curve of a frusto-conical ring spring is fundamentally not suited for valves because the characteristic curve, that is, in graphic illustration, the varying value of the spring force compared with that of the stroke results in a characteristic curve excessively concaved toward the origin of the coordinate system after which the spring force rises only gently toward the end of the stroke while during the first part of the stroke it exhibits a steep rise. In valve springs, however, a reverse characteristic is desired in which the spring force rises first gently and toward the end of the stroke at a steeper slope so that from this steep slope an abrupt damping results. This damping could not heretofore be achieved by exclusive employment of simple springs.

The present invention proceeds from the realization that it is possible to render the known combination of several frusto-conical spring rings contacting one another along their entire conical surfaces, on one hand soft in spring action and on the other hand adapted for valves, when one interposes planar spring rings between adjacent frusto-conical spring rings.

Accordingly the present invention relates to a spring assembly for ring valves which constitutes a spring ring package composed of frusto-conical spring rings the adjacent spring rings of which contact one another along the entire conical surfaces, thereby characterized that for pulling apart the spring ring package between each two adjoining frusto-conical spring rings at least one planar spring is arranged. It is possible with satisfying result to provide without additional means frusto-conical spring rings in valve construction. In order to obtain as light a construction as possible and to fully utilize the advantage resulting from the employment of frusto-conical spring rings and consisting in the arrangement of the spring ring abutting the valve ring over the entire circumference, it is advisable to make the abutting diameter of the spring ring about corresponding to the mean diameter of the valve seat or of the valve ring. In this manner it is possible to employ very light valve rings without there being the danger of these valve rings bending through.

The accompanying drawing shows several embodiments of the invention.

Fig. 1 is a diagrammatic view which besides the characteristic of a spring according to the invention illustrates two additional spring characteristics as a basis of comparison.

Fig. 2 shows a valve with a spring package in vertical central longitudinal section.

Fig. 3 shows the same valve with the spring rings compressed.

Figs. 4 to 7 show in plan modified forms of a slotted spring ring for plural ring valves.

In Fig. 1 the dotted line 20 represents as a basis of comparison the load-deflective characteristic of a helical spring without air damping and which is known to be a straight line and to follow Hooke's law. The line 21 is the characteristic of a single conical ring spring or of a set according to the invention having a straight section.

It will be seen here that in the first part, which is denoted by 22 and which represents the initial loading, the characteristic rises more sharply. This is followed in the second part (reference 23) by the actual valve lift, which has a declining characteristic. This declination is explained by the fact that the extension and shrinkage paths in the last part of the spring movement become smaller in relation to the lift. The curve 24 shows the characteristic of a spring assembly according to the present invention with a plurality of alternate conical and flat ring springs. The slope of the curve is for the most part equal to that of a helical spring, while finally, in the part 25, the last part of the valve stroke, a sharp rise 26 occurs, which approaches the ordinate 27. This rise is due to the fact that at the end of the stroke all ring springs, the frusto-conical ones as well as the flat ones, lie upon one another. This point results from the product of the force of the individual spring and the number of the used spring rings. In this manner a pronounced damping stroke 28 originates.

In the embodiment according to Fig. 2 two different sorts of spring rings, namely, frusto-conical spring rings 52 and flat spring rings 53, are united in a spring ring package, the two kinds of spring rings alternately following one another and the adjacent spring rings each contacting another on a margin throughout the entire circumference so that the section according to Fig. 2 results in a zig-zag shaped profile. Vertical guide parts 54 are uniformly distributed in the valve retaining member 55 throughout the entire periphery and serve to guide the valve ring 56 which the lowest frusto-conical spring ring 57 abuts. In order to assure a uniform pressure of the valve ring 56 abutting the valve seat 58, the abutting diameter of the spring ring 57 abutting the valve ring 56 must be approximately as large as the mean diameter of the valve ring 56. Deviating from the illustration in the drawing, of course the valve ring 56 may have the same width or wider width as the valve seat 58, the guide parts 54 for the valve ring being correspondingly changed to the inside. In such a case, however, the abutting diameter of the spring ring 57 abutting the valve seat should correspond to about the middle diameter of the valve seat, at any rate smaller than the exterior diameter and larger than the interior diameter of the valve seat 56.

When the valve is opened the spring rings 52, 53 and 57 can first freely oscillate. When more tightly compressed as appears from Fig. 3 all springs arrange themselves in parallel juxtaposition, the originally planar spring rings assuming a frusto-conical shape and a shape like that of the originally frusto-conical spring rings 52 and 57 in the form of a truncated cone of lesser slope than the original truncated cone of spring rings 52 and 57. In this state all spring rings are arranged one behind the other in the manner of a leaf spring package, the spring characteristic undergoing a change of shape illustrated above by Fig. 1 during the last part of the valve stroke, about corresponding to curve 24 of Fig. 1 which though relates to slotted spring rings as they are subsequently described.

In the embodiment of a spring ring according to Fig. 4 in the middle part of the ring zone circular arc-shaped slots 59 are provided which lie concentrically to the ring spring axis and in a peripheral direction have the same length and the same division so that between two adjacent slots a bridge 60 of the same width lies. These ring springs are softer because of the arrangement of ring slots so that one can employ them, for example, with a short stroke and large diameter, thus also with low slope of the cone while either foregoing the final damping in the characteristic or while using other damping means, also as individual spring, with particular advantage however as spring package within the meaning of the preceding embodiment. The radial slots further enhance the softness and by their presence afford an additional possibility to effect a final damping. If namely one makes the slots so narrow that the adjacent ends of remaining ring parts abut one another already prior to the stroke end, during the beginning of the stroke this ring part is excluded from the spring action, however at the stroke end participates in it. These slots correspond to the ring slots in the known plural ring valve plates so that in this form of execution the ring springs may be used as well in the above-described ring spring package form as also—owing to their high softness which may still be enhanced by measures subsequently described in detail—in the present case as single springs, the enhanced softness resulting on one hand from the large diameter and on the other hand from the arrangement of the circular slots. Each circular arc-shaped slot 59 is connected to a radial slot 62 extending from the inner margin of the spring ring. The radial slots 62 among themselves have equal division and are so situated that the circular arc-shaped slots lie symmetrically with respect to them. The innermost part of the circular ring in consequence consists of a series of hammerhead-shaped parts of which three adjoining ones are denoted by 61, 63 and 64. In the bridge 60 of the hammerhead part 61 a bore 65 is provided which serves to secure the spring ring against turning with respect to the not-illustrated valve ring and through which correspondingly a special guide part in the state of use is guided.

Owing to the presence of the radial slots 62 and circular arc-shaped slots 59 merely the annular spring ring zone lying exterior to the latter is free from slots and unchanged in its elastic behavior while the circular ring zones situated more inwardly have correspondingly changed spring qualities, the slots being so dimensioned and so arranged that the spring rings have the spring qualities desired in each particular case.

The embodiment according to Fig. 5 is in principle distinguished from that of Fig. 4 by the fact that the innermost annular zone 66 of the spring ring is free from slots and correspondingly the hammerhead-shaped parts 67 and 70 and the radial slots 68 extending from the outer margin lie in the outermost annular zone. The bridges 69 between the arcuate slots correspond in location and form to bridges 60 according to the embodiment of Figure 4. Also here in one of the bridges a guide bore corresponding to that at 65 of Figure 4 is provided.

In the spring ring according to Figure 6 which is provided for a three-ring valve, which in a sense is a combination of the embodiment of Figures 4 and 5, in which in the outer marginal zone hammer-head shaped parts 71 and in the inner marginal zone such parts 72 are provided of which each two adjacent parts are separated by a radial slot 73. The spring ring has a middle, slot free annular zone 74. In view of the bridges of a hammer-head shaped part again a bore 75 for a guide part is provided.

In the embodiment of Figure 7 for a quadruple ring valve, the spring ring is provided with radial slots 80 extending from the outer margin and with radial slots 81 and 82 extending from the inner margin which are connected with arcuate slots. Thereby at the outer margin hammer-head shaped part 77 are formed the bridges of which merge into a slot free annular zone 76. Analogously at the inner margin hammer-head shaped parts 79 are formed while the arcuate slots of the two inner series which are each connected to one another by a radial slot 82, are separated from one another by arcuate lugs 78.

In one of the bridges of the hammer-head parts 79 is again provided a bore 83 for an anti-rotational device.

A spring ring of Figure 7 is suited for plural ring valves with plural ring valve plates, at least the spring ring in contact with the plural ring valve plate is provided with concentric arcuate slots which in their arrangement conform to the shape of the plural ring valve plate.

I claim:

1. A ring valve of the type having a seat and a valve ring, a spring arrangement consisting of a spring package including a plurality of conical-frustum shaped annular springs arranged in superposed parallelism and a plurality of plane annular springs each of which is arranged between and cooperate with two adjacent rings of conical frustum shape to spread the spring package and the lowermost spring being of conical-frustum shape and having a smaller external diameter than the other ring springs and being adapted to bear against the medial portion of the valve ring.

2. A ring valve of the type having a seat and a valve ring cooperating therewith, a spring arrangement consisting of a spring package including a plurality of conical-frustum shaped annular springs arranged in superposed parallelism, a plurality of plane annular springs each of which is arranged between and cooperates with two adjacent rings of conical-frustum shape to spread the spring package, the lowermost spring being of conical-frustum shape and having a smaller external diameter than the other ring springs and adapted to bear against the medial portion of the valve ring, and certain of the springs being provided with radial slits which extend to one of the edges thereof.

3. A ring valve of the type having a seat and a valve ring cooperating therewith, a spring arrangement consisting of a spring package including a plurality of conical-frustum shaped annular springs arranged in superposed parallelism, a plurality of plane annular springs each of which is arranged between and cooperates with two adjacent rings of conical-frustum shape to spread the spring package, the lowermost spring being of conical-frustum shape and having a smaller external diameter than the other ring springs and adapted to bear against the medial portion of the valve ring, and certain of the springs being provided with radial slits which extend to the outer edge thereof.

4. A ring valve of the type having a seat and a valve ring cooperating therewith, a spring arrangement consisting of a spring package including a plurality of conical-frustrum shaped annular springs arranged in superposed parallelism, a plurality of plane annular springs each of which is arranged between and cooperates with two adjacent rings of conical-frustrum shape to spread the spring package, the lowermost spring being of conical-frustrum shape and having a smaller external diameter than the other ring springs and adapted to bear against the medial portion of the valve ring, and certain of the springs being provided with radial slits which extend to the inner edge thereof.

5. A ring valve of the type having a seat and a valve ring cooperating therewith and also having a valve retaining member having a horizontal flange arranged above the ring and further having a vertically disposed ring guide for cooperating with the inner edge of the valve ring, a spring arrangement comprising a spring package consisting of a plurality of conical-frustrum shaped annular springs arranged in superposed parallelism above the seat and along the vertical guide and between the ring and the flange, and a plurality of plane annular springs each of which is arranged between and cooperates with two adjacent rings of conical-frustum shape to spread the spring package, and another frustrum-conical leaf spring situated beneath the other springs and of a smaller external diameter and having its outer edge bearing against the medial portion of the valve ring.

6. A ring valve as claimed in claim 5, in which means are provided for preventing the springs from turning.

7. A ring valve as claimed in claim 5. in which certain of the springs are provided with a plurality of concentric series of arcuate slots leaving intermediate circular areas concentric to the ring axis, and further provided with radial slits leading from the respective inner and outer edges of the adjacent arcuate slots, at least one of said circular areas being continuous thereby forming an uninterrupted ring zone.

References Cited in the file of this patent

UNITED STATES PATENTS

| 1,176,632 | Werner | Mar. 21, 1916 |
| 1,324,137 | Wikander | Dec. 9, 1919 |
| 1,654,320 | Colby | Dec. 27, 1927 |
| 2,062,816 | Mercer | Dec. 1, 1936 |
| 2,297,943 | Collins | Oct. 6, 1942 |
| 2,445,638 | Saks | July 20, 1948 |
| 2,516,236 | Moorhead | July 25, 1950 |
| 2,604,316 | O'Brien | July 22, 1952 |

FOREIGN PATENTS

| 38,617 | Switzerland | 1903 |
| 142,741 | Austria | 1935 |
| 142,742 | Austria | 1935 |